US012566933B1

(12) United States Patent
Mak et al.

(10) Patent No.: US 12,566,933 B1
(45) Date of Patent: Mar. 3, 2026

(54) SYSTEMS DEVICES AND METHODS FOR TRANSMISSION OF DIFFERING IMAGE FRAME FORMATS DURING A STREAMING SESSION

(71) Applicant: Zebra Technologies Corporation, Lincolnshire, IL (US)

(72) Inventors: Jason S. Mak, Commack, NY (US); Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/946,647

(22) Filed: Nov. 13, 2024

(51) Int. Cl.
*G06K 7/14* (2006.01)
*G06F 13/28* (2006.01)
*G06K 7/10* (2006.01)

(52) U.S. Cl.
CPC ........... *G06K 7/1413* (2013.01); *G06F 13/28* (2013.01); *G06F 2213/28* (2013.01); *G06K 2007/10524* (2013.01)

(58) Field of Classification Search
CPC .... G06K 7/1413; G06K 7/14; G06K 7/10722; G06F 13/28
USPC ..... 235/462.41, 462.24, 462.11, 462.01, 375
See application file for complete search history.

(56) References Cited

U.S. PATENT DOCUMENTS

2022/0329847 A1* 10/2022 Parashar ................... G06T 7/11
2025/0252594 A1* 8/2025 Bramley .............. G06V 40/167
2025/0252706 A1* 8/2025 Brothers, III ........ G06V 10/469

* cited by examiner

*Primary Examiner* — Edwyn Labaze
(74) *Attorney, Agent, or Firm* — Yuri Astvatsaturov

(57) ABSTRACT

The present disclosure relates to systems, devices, and methods for dynamically managing image frame formats during a streaming session in machine vision applications. An imaging assembly captures images with varying frame formats and communicates with a host equipped with a processor, memory, and vision analysis module. Utilizing direct memory access (DMA), the host efficiently stores images by adjusting DMA parameters to accommodate format changes without session interruption. This approach may eliminate the need for image padding, optimizing memory usage and data transmission. The system enhances adaptability in real-time imaging tasks, such as barcode scanning, by seamlessly switching between different frame formats based on image characteristics. The method includes initiating an imaging session triggered by external events and processing captured images for machine vision tasks, thereby improving system responsiveness and throughput in diverse industrial and commercial environments.

23 Claims, 5 Drawing Sheets

SYSTEMS DEVICES AND METHODS FOR TRANSMISSION OF DIFFERING IMAGE FRAME FORMATS DURING A STREAMING SESSION

BACKGROUND

In the context of machine vision devices like imaging-based indicia readers (also referred to as barcode readers), during each streaming session the communication between an imaging assembly and a host remains static. As a result, adjustments to image frame formats during any one session are not feasible. While one solution to addressing this issue includes padding each image to a largest potential memory size, this creates numerous issues related to inefficiency. Accordingly, there is a need for solutions which enable an efficient change in imaging frame formats during a streaming session.

SUMMARY

In an embodiment, the present disclosure describes a system for capturing and processing image data comprising: an imaging assembly operable to capture a plurality of images during an imaging session; and a host communicatively coupled with the imaging assembly, the host having a processor, a memory, and a vision analysis module, the processor being operable to control storage of at least some of the plurality of images in the memory via direct memory access (DMA), wherein: the imaging assembly is configured to capture a first image having a first frame format and a second image having a second frame format that is different from the first frame format; during the imaging session, the imaging assembly transmits data associated with the second frame format to the host; the processor sets at least one parameter associated with the DMA to store, in the memory, the first image having the first frame format; during the imaging session and based on the data associated with the second frame format, the processor modifies the at least one parameter associated with the DMA to store, in the memory, the second image having the second frame format; the processor is configured to perform a machine vision task on at least one of the first image or the second image via the vision analysis module; and the imaging session is defined as lasting between a trigger to activate the imaging assembly in response to an external triggering event and at least one of a timeout period, receipt of a signal indicative of a successful completion of a machine vision task via the vision analysis module, or a signal indicative of a termination of the external triggering event.

In another embodiment, the present disclosure describes a method for capturing and processing image data, comprising: initiating an imaging session associated with an imaging assembly; during the imaging session: capturing, via the imaging assembly, a first image having a first frame format; transmitting the first frame having the first frame format to a host and storing, via direct memory access (DMA), the first image in a memory of the host; transmitting, from the imaging assembly to the host, data associated with a second frame format; modifying at least one parameter associated with the DMA to store, in the memory, a second image having the second frame format; capturing, via the imaging assembly, the second image having the second frame format; transmitting the second frame having the second frame format to the host and storing, via the DMA, the second image in the memory of the host; and processing at least one of the first image or the second image via a vision analysis module of the host for a machine vision task, wherein the imaging session is defined as lasting between a trigger to activate the imaging assembly in response to an external triggering event and at least one of a timeout period, receipt of a signal indicative of a successful completion of a machine vision task via the vision analysis module, or a signal indicative of a termination of the external triggering event.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
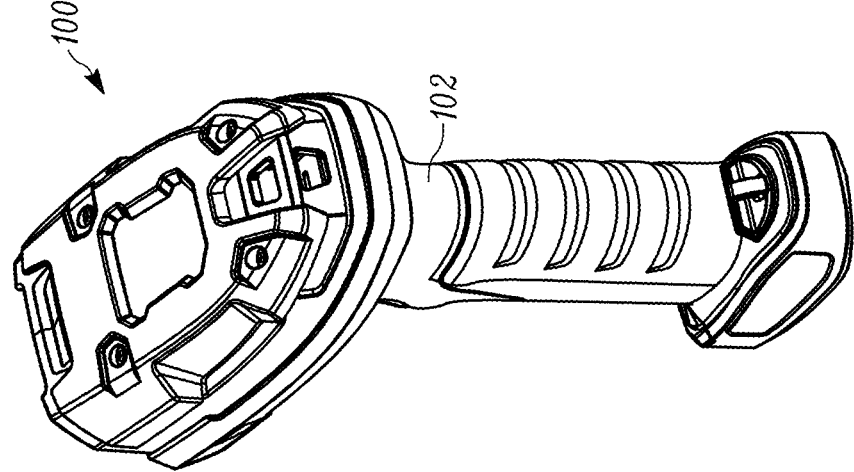
FIG. 1 illustrates a perspective view of an exemplary barcode reader in accordance with the teachings of this disclosure.
Figure 1:
Figure 1:
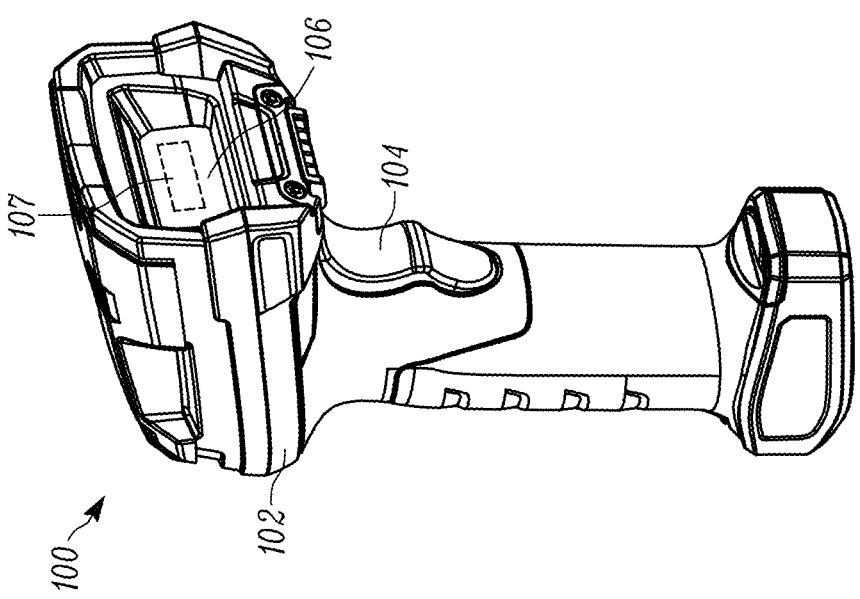

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

Referring to FIG. 1, shown therein is an example barcode reader 100 having a housing 102 with a cavity for housing internal components, a trigger 104 and a housing window 106. In this example, an example imaging assembly 107 is positioned within the cavity of the housing 102 and is configured to capture image data through the housing window 106 and, specifically, to read barcodes (1D and/or 2D) over a working distance range. The imaging assembly 107 (for example, an imaging engine) may be referred to as an imaging assembly that includes elements such as, for example, an aiming light assembly, an illumination light assembly, and/or an imaging assembly including optical components and image sensor(s).

The barcode reader 100 can be used in a hands-free mode as a stationary workstation when it is placed on the countertop in a supporting cradle (not shown). The barcode reader 100 can also be used in a handheld mode when it is picked up off the countertop (or any other surface) and held in an operator's hand. In the hands-free mode, products can be slid, swiped past, or presented to the window 106. In the handheld mode, the barcode reader 100 can be aimed at a barcode on a product, and the trigger 104 can be manually depressed to initiate imaging of the barcode. In some implementations, the supporting cradle can be omitted, and the housing 102 can also be in other handheld or non-handheld shapes.

Figure 2:
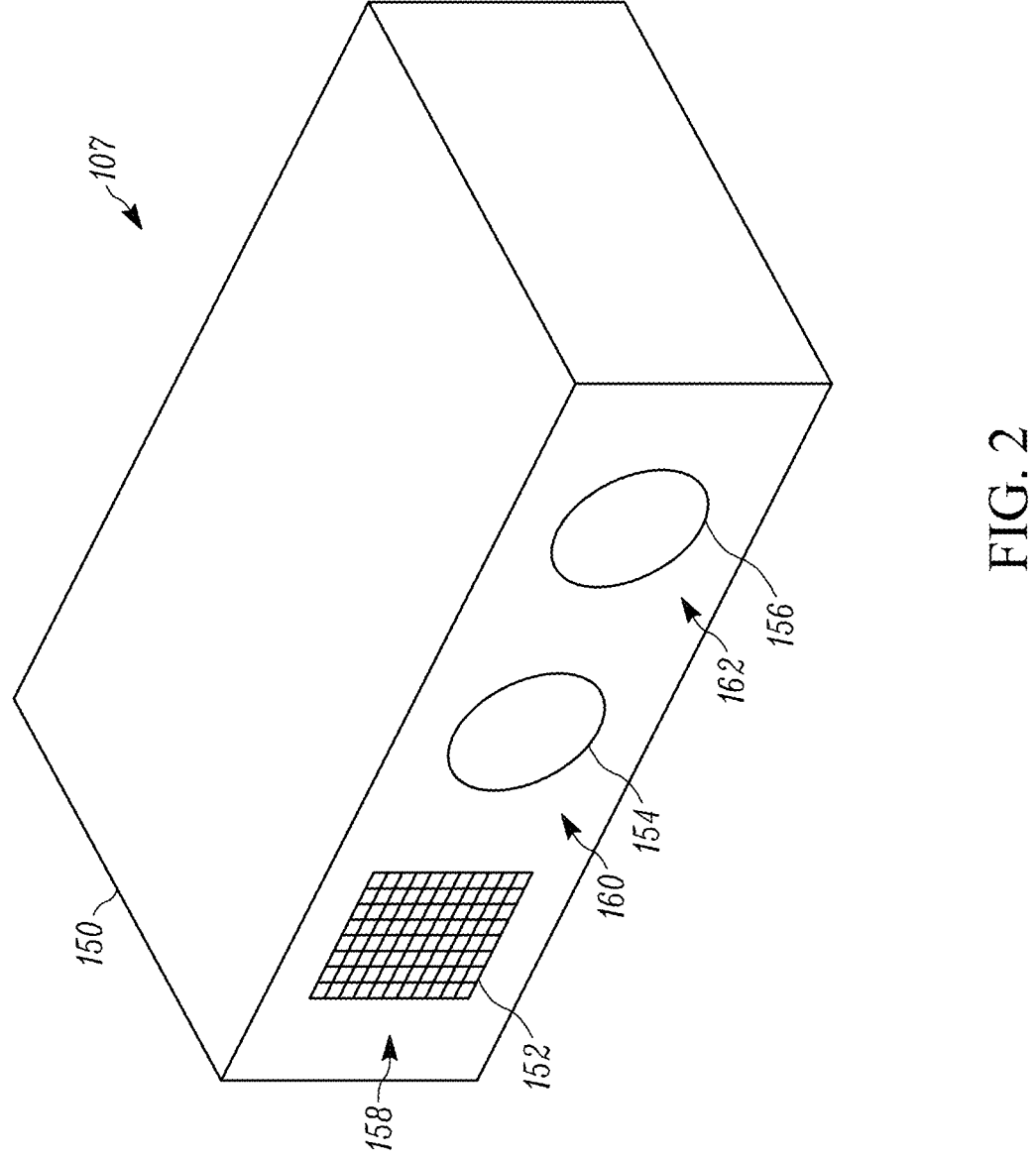
FIG. 2 illustrates an isometric view of an example imaging assembly that can be used in the barcode reader of FIG. 1.

FIG. 2 illustrates an isometric view of an exemplary imaging assembly 107 that can be used to implement the barcode reader 100 of FIG. 1. In the illustrated example, the imaging assembly 107 includes a housing 150 defining a first aperture 152, a second aperture 154, and a third aperture 156. In some embodiments, apertures 152-156 may include light-transmissive windows positioned therein. This can assist with preventing dust particles from entering the housing 150 and settling on components therein. In some embodiments, the light transmissive windows can be designed to pass light therethrough without alteration; in some other embodiments, the light transmissive windows can include integrated lenses and/or lens-like components designed to alter the trajectory of light normally incident thereon. Housed behind the first aperture 152 and inside the housing 150 is an illumination assembly 158 used to provide illumination light to illuminate targets that are being imaged by the barcode 100. Housed behind the second aperture 154 and inside the housing 150 is an optical arrangement 160 configured to direct light external to the imaging assembly 107 in a predefined manner towards an imaging sensor. And housed behind the third aperture 156 and inside the housing 150 is an aiming light assembly 162 configured to provide an aiming light pattern to help the barcode operator visually ascertain the direction of the barcode reader's field of view. If should be understood that components like the housing 150, and elements associated with the illumination assembly 158 and aiming light assembly 162 are merely exemplary and are not necessary for achieving the scope of at least some embodiments of the invention.

Figure 3:
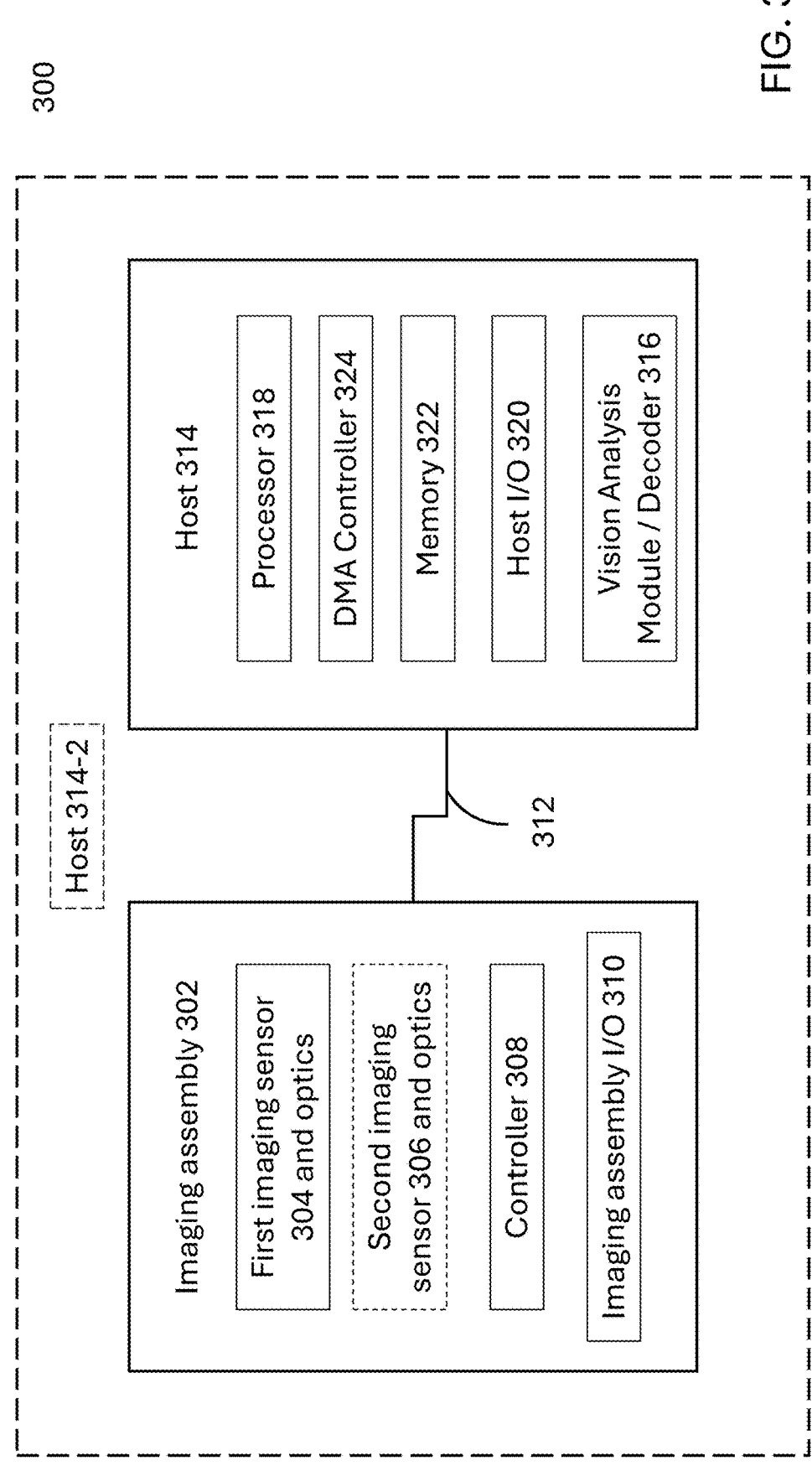
FIG. 3 is an exemplary block diagram representation of a system for capturing and processing image data in accordance with an embodiment of the present disclosure.

Referring now to FIG. 3, shown therein is an exemplary block diagram representation of a system 300 in accordance with an embodiment of the present disclosure. The system 300 includes an imaging assembly 302, which could be implemented as the imaging engine 150 of the earlier-discussed examples. The imaging assembly 302 includes a first imaging sensor 304 and an optional second imaging sensor 306. Each sensor may be a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by respective imaging optics over a field of view. The light that impinges on the pixels is sensed and the output of those pixels produce image data that is associated with the environment that appears within the field of view. Operation of the imaging assembly 302 is normally controlled by a controller 308 which is operable to control the operation of the sensor(s), auxiliary systems like an aiming system and/or the illumination system, focusing of optics, and the exchange of data through the imaging assembly I/O 310 via communication means 312 which include, but aren't limited to serial bus, I2C bus, universal serial bus, general-purpose input/output bus, etc.

Images captured by the imaging sensor(s) 304/306 are normally transmitted to the host 314 which can take a variety of forms. In some examples, the host 314 is an external host relative to the imaging assembly 302 whereby the host resides separately from the imaging assembly 302. In other examples, the host may include the imaging assembly as part of its overall construction, as is illustrated with host 314-2. An example of this can be found in the barcode reader 100 of FIG. 1 where the imaging engine (i.e., the imaging assembly) is positioned within the housing of the host device. Other examples of such a configuration can include: enterprise mobile computers like, for example, the TZ70 mobile computer made by Zebra Technologies Corporation; tablets like, for example, the ET40 mobile tablet made by Zebra Technologies Corporation; kiosks like, for example, the KC50 kiosk made by Zebra Technologies Corporation; and other devices where image data may need to be captured by an imaging assembly and thereafter processed for various machine vision task. Additionally, while the imaging assembly described herein has been associated with what is commonly known as an imaging engine which is manufactured for integration into or with other processing devices like what has been described, the scope of this disclosure should not be seen as being limited to this configuration and should instead be seen as extending to other configurations like a dedicated platform arrangement of the imaging assembly and the host operate as a platform device rather than a combination of an OEM-style imaging engine and a separate host.

Returning to the FIG. 3, image data, normally captured as a series of image frames, is transmitted to the host 314 for processing via the vision analysis module 316. This can include a variety of machine vision tasks like object detection, barcode reading, action recognition, edge detection, image segmentation, etc. In some cases, the module 316 may be a dedicated barcoding decoding module configured to decode barcodes (also referred to as indicia) that are present within the image frames. In such instances, the module 316 may be referred to as a decoding module or a decoder module. It should be appreciated that operations performed by the module 316 may be performed with by software, firmware, hardware, or any combination thereof.

To perform the foregoing image analysis, the host 314 employs a processor 318 which may control various aspects of the host's operations, including receiving the image data from the imaging assembly across the communication means 312 and through the host I/O 320. Additionally, the processor may transmit control signals across communication means 312 which can act as start and/or stop triggers for conducting imaging session. Normally, an imaging session (also referred to as a scan session) can be defined as a series of frames captured between a starting trigger and an ending trigger. A starting (logical) trigger may be activated by the physical activation of a physical trigger like the trigger 104 of FIG. 1. A press of trigger 104 can be interpreted by the processor 318 as an activation of an imaging session on the reader 100 and a signal indicating that the imaging assembly should start capturing image frames is sent from the host 314 to the imaging assembly 302. In another example, a detection of an object (for example via IR or vision analysis) in a field of view of a presentation scanner may similarly act as a trigger which begins an imaging session.

Once started, the imaging session comprises of the imaging assembly capturing an n number of image frames which are transmitted to the host. These images may come from any optical sensing source within the assembly, like the sensor(s) 304 (306). This imaging session normally continues until one of several conditions is met. In some examples, the session may continue until a certain amount of time has passed. This is typically referred to as a timeout period and, if talking about barcode readers, is typically provided in cases where the scan session passes a predetermined threshold of time without a successful completion of a vision task like a successful decode of a barcode. In these cases, it is assumed that the subject of the vision operation is not present in the field of view of the readers and therefore an operation can be terminated.

In other instances, the imaging session may be terminated in response to a successful performance of the desired machine vision task. For example, if a host (like a barcode reader) successfully decodes a barcode present in one of the image frames analyzed by the module 316, the host can signal the imaging assembly to stop its image capture operations.

In another example, the imaging session may be terminated in response to receiving a termination signal or a cessation of the initial activation trigger. For example, if an operator of reader 100 pulls the trigger 104 and subsequently releases the trigger 104 after some time, the release of trigger 104 can be seen as a termination signal that can occur before or after a successful completion of a vision task. It should be appreciated that while a physical activation of a mechanical trigger has been described in connection with the trigger signal, this is only exemplary and other mechanical and/or electrical triggers are within the scope of the present disclosure.

To process image data via the analysis module 316, that data is generally first stored in the memory 322 of the host 314. In a preferred embodiment this is done via direct memory access (DMA) which is a technology utilized in computing systems to enable efficient data transfer between peripheral devices and system memory without continuous intervention from the central processing unit (CPU) like the processor 318. In a typical scenario, a DMA controller 324 is responsible for managing these transfers. The processor 318 initiates a DMA operation by providing the DMA controller 324 with necessary parameters such as the source address, destination address, data length, and transfer direction. Once configured, the DMA controller 324 takes over the data transfer process, allowing the processor 318 to perform other tasks concurrently. This process enhances system efficiency by reducing processor's involvement in data movement, thus reducing processor bottlenecks and improving overall system performance. DMA is particularly beneficial in applications requiring high-speed data throughput, such as video streaming, audio processing, and real-time data acquisition. Various transfer modes can be employed, including burst mode, cycle stealing, and transparent mode, each offering different advantages in terms of speed and system resource allocation.

Figure 4:
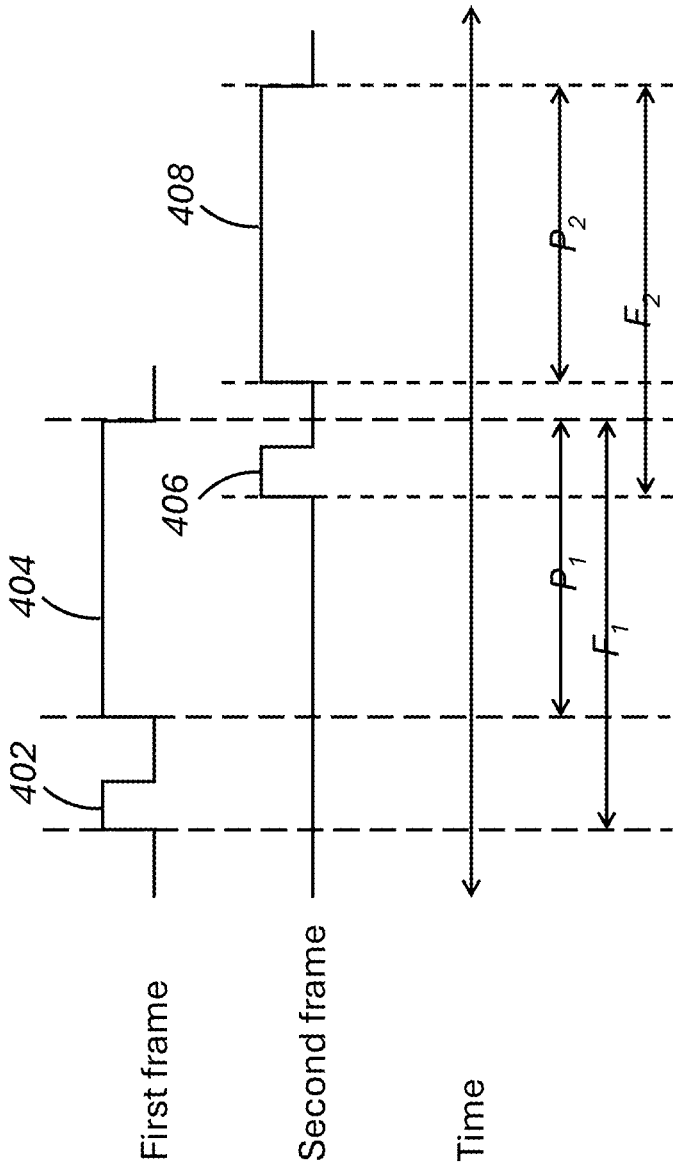
FIG. 4 is an exemplary timing diagram of the operation of an imaging assembly of the system of FIG. 3.
Figure 5:
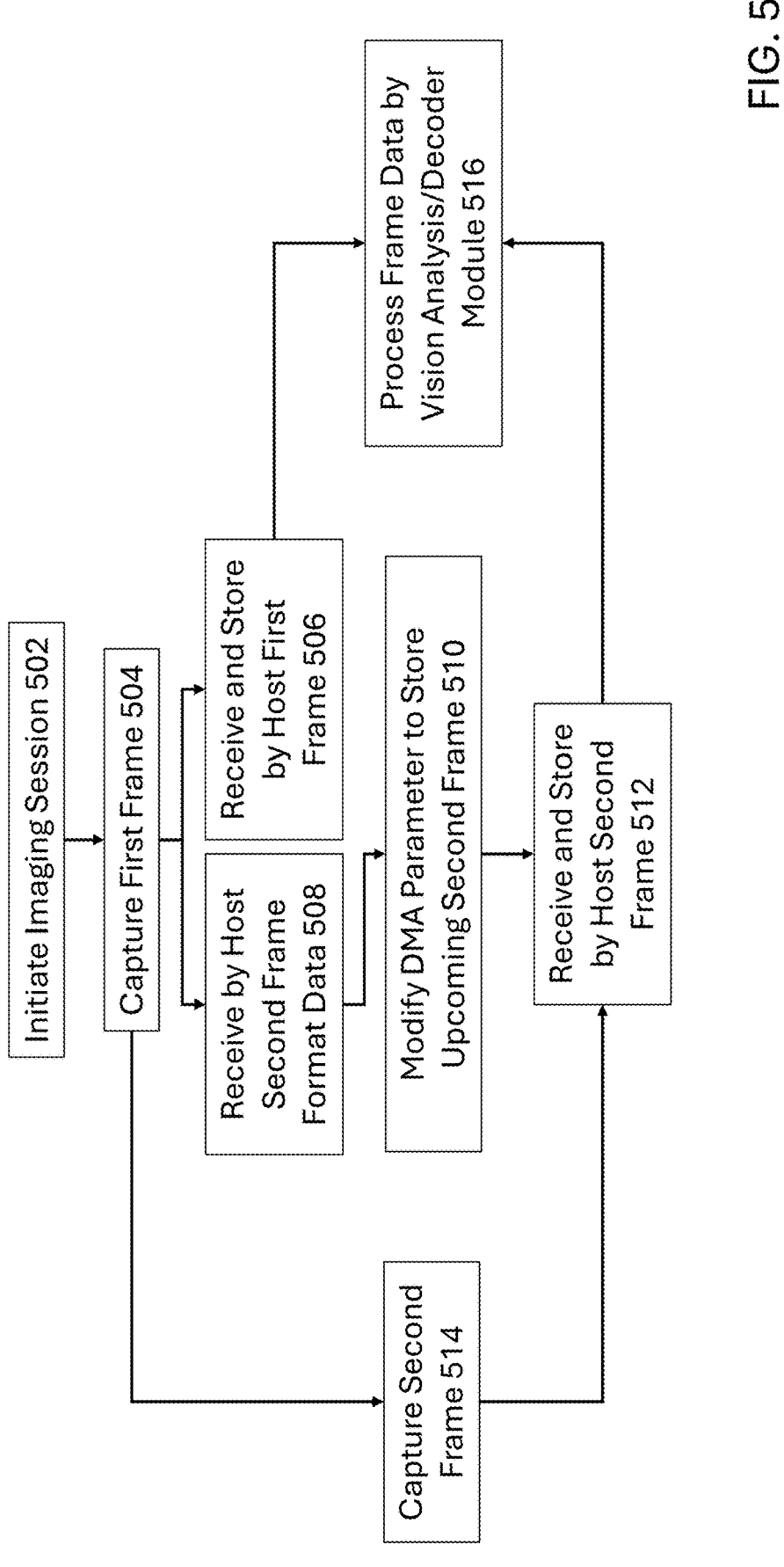
FIG. 5 a flowchart representative of an exemplary method of operation of the system of FIG. 3.

With reference to FIGS. 4 and 5, which respectively illustrate the general operation of the system of FIG. 3 and a flowchart representative of an exemplary method of operation, it is possible to describe the operation of an imaging system and its host in accordance with embodiments of the present disclosure. Normally, once an imaging session commences, frame format parameters are either received by the host or are known by the host, and the DMA controller configures the memory to properly receive image data for storage. This remains as such until the imaging session is terminated and until a new session with new frame parameters can begin. This has the effect of prohibiting a change in frame format parameters mid-reading session. While in theory is it possible to stop and start sessions as needed, practically speaking such stops and starts introduce undesired delays, reducing system performance. As a result, switching from one frame format to another frame format mid-imaging session has been problematic. As used herein, a difference between frame formats may be defined as frame formats that require a different set of DMA parameters for storage in a memory. This can be a difference in image width, image height, bits per pixel, pixel color format, presence of metadata, compression algorithm, encoding algorithm, or any combination thereof.

To address this problem, the present disclosure provides a novel approach 500, as detailed in the exemplary flowchart of FIG. 5. The process begins with the initiation of an imaging session 502. During the session, the imaging assembly begins to capture a series of frames which includes capturing a first frame 504. Normally this frame will be captured with a first frame format that is known by the host DMA controller one way or another. This can be based on a default setting for capturing a first frame of a session, a signal sent by the imaging assembly indicating its frame format to the host, a processor determining the parameters in connection with a beginning of a scan session, etc. Referring to FIG. 4, the first frame occurs with over the time period $F_1$ and includes an exposure period 402 and a readout period 404 which occurs over the time period $P_1$. As the first frame is captured, it is subsequently received and stored 506 by the host in the memory via DMA. As noted, this occurs during time period $P_1$ which may or may not overlap with the next frame. Subsequent to capturing the first frame, the imaging assembly captures a second frame with a second frame format that is different from the first frame format with the frame also having an exposure period 406 and readout period 408. However, prior to the readout period 408, the host receives data that is associated with (for example directly indicative of) the second frame format 508. This can be accomplished in in a variety of ways. For example, data indicative of the second frame format can be appended as meta data to the first image such that it is received and processed by the host sometime during the readout period $P_1$. Another example of obtaining the second frame format data can include the imaging assembly transmitting the requisite data across a communication bus like a general-purpose input/output bus or a serial communication bus (which can include universal serial bus). This can be done based on the imaging assembly's determination that a switch from the first frame format to the second frame format is required or in response to a query signal from the host requesting the frame format that is associated with an upcoming frame.

In response to receiving the data associated with the second frame format, the host processor modifies at least one configuration parameter associated with the DMA to enable the storage, in the memory of the host, of a frame having the second frame format. The modification can include a change to the DMA controller parameter which can include, but are not limited to, a source address parameter, a destination address parameter, a transfer size parameter, a transfer mode parameter, a priority level parameter, or any combination thereof. Additionally, rather than modifying parameters of the DMA controller, the host can utilize a first DMA controller to store the first image with the first frame format, and to select a second DMA controller to store the second image having the second frame format. In this case the second DMA controller can be preconfigured to accommodate the second frame format.

Once the DMA parameter(s) have been modified the host receives and stores 512 the second frame having the second frame format. It should be appreciated that the second frame can be captured (i.e., the sensor can be exposed) at step 514 by the imaging assembly any time after the capture of the first frame 504. What is important is that the second frame format is received by the host and that the host modifies the necessary DMA parameters prior to the second frame being read out by the imaging assembly (or the sensors(s) associated therewith). As a result, the actual exposure period associated with the second frame may overlap with the readout period of the first frame. Additionally, it is not necessary, though possible, to have the first frame sequentially followed by the second frame. Instead, there may be intervening frames between the first frame and the second frame.

When the frames are received by the host and stored in its memory, they can then be sent to the vision analysis module for processing 516 in a manner consistent with the earlier description of the module 316.

The described system and approach offer several key benefits that enhance the efficiency and flexibility of image data processing in machine vision applications. By enabling dynamic changes in image frame formats during a single streaming session, the system eliminates the need for padding images to the largest potential size, thereby reducing transmission time and conserving memory resources. This flexibility allows for more efficient use of bandwidth and processing power, as the system can adapt in real-time to varying imaging requirements. The ability to switch DMA parameters or utilize multiple DMA controllers ensures that the host can accommodate different image formats seamlessly, enhancing system responsiveness and reducing latency. This is particularly advantageous in applications such as barcode scanning, where rapid adaptation to different image characteristics can improve accuracy and throughput. Furthermore, by reducing processor involvement in data transfers through direct memory access, the system frees up processing capacity for executing complex vision tasks, thereby optimizing overall system performance and enabling more sophisticated real-time analysis. These improvements not only enhance the operational efficiency of machine vision devices but also extend their applicability across a broader range of industrial and commercial environments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for capturing and processing image data comprising:

an imaging assembly operable to capture a plurality of images during an imaging session; and a host communicatively coupled with the imaging assembly, the host having a processor, a memory, and a vision analysis module, the processor being operable to control storage of at least some of the plurality of images in the memory via direct memory access (DMA), wherein:

the imaging assembly is configured to capture a first image having a first frame format and a second image having a second frame format that is different from the first frame format;

during the imaging session, the imaging assembly transmits data associated with the second frame format to the host;

the processor sets at least one parameter associated with the DMA to store, in the memory, the first image having the first frame format;

during the imaging session and based on the data associated with the second frame format, the processor modifies the at least one parameter associated with the DMA to store, in the memory, the second image having the second frame format;

the processor is configured to perform a machine vision task on at least one of the first image or the second image via the vision analysis module; and the imaging session is defined as lasting between a trigger to activate the imaging assembly in response to an external triggering event and at least one of a timeout period, receipt of a signal indicative of a successful completion of a machine vision task via the vision analysis module, or a signal indicative of a termination of the external triggering event.

2. The system of claim 1, wherein the imaging assembly includes a first imaging sensor having a first resolution and a second imaging sensor having a second resolution that is different from the first resolution, and wherein the first image is captured by the first imaging sensor and the second image is captured by the second imaging sensor.

3. The system of claim 1, wherein the first frame format differs from the second frame format in at least one of image width, image height, bits per pixel, pixel color format, presence of metadata, compression algorithm, or encoding algorithm.

4. The system of claim 1, wherein the at least one parameter associated with the DMA includes a DMA controller configuration parameter.

5. The system of claim 4, wherein the DMA controller configuration parameter includes at least one of a source address parameter, a destination address parameter, a transfer size parameter, a transfer mode parameter, or a priority level parameter.

6. The system of claim 1, wherein the processor is operable to utilize a first DMA controller to store, in the memory, the first image having the first frame format, and to select a second DMA controller to store, in the memory, the second image having the second frame format, the second DMA controller being preconfigured to accommodate the second frame format.

7. The system of claim 6, wherein the selection of the second DMA controller is based on a predetermined condition selected from at least one of a change in image resolution, a change in color format, or a command received from the imaging assembly.

8. The system of claim 1, wherein the imaging assembly transmits the data associated with the second frame format to the host by including the data associated with the second frame format with a transmission of the first frame to the host.

9. The system of claim 1, wherein the imaging assembly transmits the data associated with the second frame format to the host by transmitting a signal over one of a general-purpose input/output bus or a serial communication bus between the imaging assembly and the host.

10. The system of claim 9, wherein the imaging assembly transmits the data associated with the second frame format to the host in response to a request made by the host.

11. The system of claim 1, wherein:

the first image is read out from the imaging assembly to the host during a first period of time $p_1$;

the second image is read out from the imaging assembly to the host during a second period of time $p_2$; and the imaging assembly transmits data associated with the second frame format to the host during some portion of the first period of time $p_1$ and before a beginning of the second period of time $p_2$.

12. The system of claim 11, wherein the second image is captured sequentially after the first image.

13. A method for capturing and processing image data, comprising:

initiating an imaging session associated with an imaging assembly;

during the imaging session:

capturing, via the imaging assembly, a first image having a first frame format;

transmitting the first frame having the first frame format to a host and storing, via direct memory access (DMA), the first image in a memory of the host;

transmitting, from the imaging assembly to the host, data associated with a second frame format;

modifying at least one parameter associated with the DMA to store, in the memory, a second image having the second frame format;

capturing, via the imaging assembly, the second image having the second frame format;

transmitting the second frame having the second frame format to the host and storing, via the DMA, the second image in the memory of the host; and processing at least one of the first image or the second image via a vision analysis module of the host for a machine vision task, wherein the imaging session is defined as lasting between a trigger to activate the imaging assembly in response to an external triggering event and at least one of a timeout period, receipt of a signal indicative of a successful completion of a machine vision task via the vision analysis module, or a signal indicative of a termination of the external triggering event.

14. The method of claim 13, further comprising:

capturing the first image with a first imaging sensor having a first resolution; and capturing the second image with a second imaging sensor having a second resolution that is different from the first resolution.

15. The method of claim 13, wherein the first frame format differs from the second frame format in at least one of image width, image height, bits per pixel, pixel color format, presence of metadata, compression algorithm, or encoding algorithm.

16. The method of claim 13, further comprising, configuring a DMA controller with at least one parameter selected from a source address parameter, a destination address parameter, a transfer size parameter, a transfer mode parameter, or a priority level parameter.

17. The method of claim 13, further comprising:

utilizing a first DMA controller to store the first image having the first frame format in the memory; and selecting a second DMA controller, preconfigured to accommodate the second frame format, to store the second image having the second frame format in the memory.

18. The method of claim 17, further comprising, selecting the second DMA controller based on a predetermined condition selected from at least one of a change in image resolution, a change in color format, or a command received from the imaging assembly.

19. The method of claim 13, further comprising, transmitting the data associated with the second frame format to the host by including the data with a transmission of the first frame to the host.

20. The method of claim 13, further comprising, transmitting the data associated with the second frame format to the host by transmitting a signal over one of a general-purpose input/output bus or a serial communication bus between the imaging assembly and the host.

21. The method of claim 20, further comprising: transmitting the data associated with the second frame format to the host in response to a request made by the host.

22. The method of claim 13, further comprising:

reading out the first image from the imaging assembly to the host during a first period of time $p_1$;

reading out the second image from the imaging assembly to the host during a second period of time $p_2$; and transmitting data associated with the second frame format to the host during some portion of the first period of time $p_1$ and before a beginning of the second period of time $p_2$.

23. The method of claim 22, wherein the second image is captured sequentially after the first image.

* * * * *